United States Patent
Parker

(10) Patent No.: US 11,836,336 B2
(45) Date of Patent: *Dec. 5, 2023

(54) IMAGE IDENTIFICATION SYSTEM

(71) Applicant: GM Cruise Holdings LLC, San Francisco, CA (US)

(72) Inventor: Cecile Lanza Parker, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,648

(22) Filed: Oct. 3, 2022

(65) Prior Publication Data

US 2023/0027501 A1 Jan. 26, 2023

Related U.S. Application Data

(63) Continuation of application No. 17/216,758, filed on Mar. 30, 2021, now Pat. No. 11,474,679, which is a continuation of application No. 16/842,118, filed on Apr. 7, 2020, now Pat. No. 10,983,681.

(51) Int. Cl.
*G06F 3/04845* (2022.01)
*G06F 3/0482* (2013.01)
*G01S 13/89* (2006.01)
*G01S 7/04* (2006.01)
*G01S 7/51* (2006.01)
*G01S 17/89* (2020.01)

(52) U.S. Cl.
CPC ............ *G06F 3/04845* (2013.01); *G01S 7/04* (2013.01); *G01S 7/51* (2013.01); *G01S 13/89* (2013.01); *G01S 17/89* (2013.01); *G06F 3/0482* (2013.01); *G06F 2203/04803* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 2013/0006525 | A1* | 1/2013 | Stroila | G01C 21/20 |
| | | | | 701/434 |
| 2013/0335573 | A1* | 12/2013 | Forutanpour | G06F 3/011 |
| | | | | 345/173 |
| 2019/0197778 | A1* | 6/2019 | Sachdeva | G06V 20/58 |
| 2020/0132822 | A1* | 4/2020 | Pimentel | G01C 21/20 |
| 2022/0343101 | A1* | 10/2022 | Chang | G01S 7/4816 |

* cited by examiner

*Primary Examiner* — Mandrita Brahmachari
(74) *Attorney, Agent, or Firm* — Akona IP PC

(57) ABSTRACT

Embodiments may relate to a graphical user interface (GUI). The GUI may include a first portion that displays an image related to images of a location. The GUI may also include a second portion that displays an image related to detection and ranging information of the location. The two images may be linked such that an interaction with an object in one portion of the GUI causes changes in the other portion of the GUI. Other embodiments may be described or claimed.

20 Claims, 14 Drawing Sheets

IMAGE IDENTIFICATION SYSTEM

PRIORITY DATA

This application is a Continuation Application of and claims priority to U.S. patent application Ser. No. 17/216,758 ("the '758 application") filed on Mar. 30, 2021. The '758 application is a Continuation of and claims priority to U.S. patent application Ser. No. 16/842,118 ("the '118 application") filed on Apr. 7, 2020. The '758 application and '118 application are incorporated by reference in their entirety.

BACKGROUND

Images at a given location may be taken using a variety of image capture technologies. One such technology may include cameras such as visible-light cameras, infrared cameras, etc. Use of this technology may include capturing a variety of images taken at various angles from the capturing device. The images may then be combined to form a panoramic view of the location. Another such technology may include light detection and ranging (LIDAR), radio detection and ranging (RADAR), or some other similar technology. LIDAR may include illuminating the location with one or more bursts of laser light, and then measuring the reflections of those bursts to identify distances between the capturing device and objects at the location. Each technique may have different advantages and disadvantages. For example, image capture may provide the benefit of allowing a user viewing the resultant images to see details such as color, shape, etc., which may not be apparent in images based on LIDAR information. By contrast, LIDAR may allow for distance measurements between the capturing device and an object that reflects the bursts of laser light.

DETAILED DESCRIPTION

Figure 1:
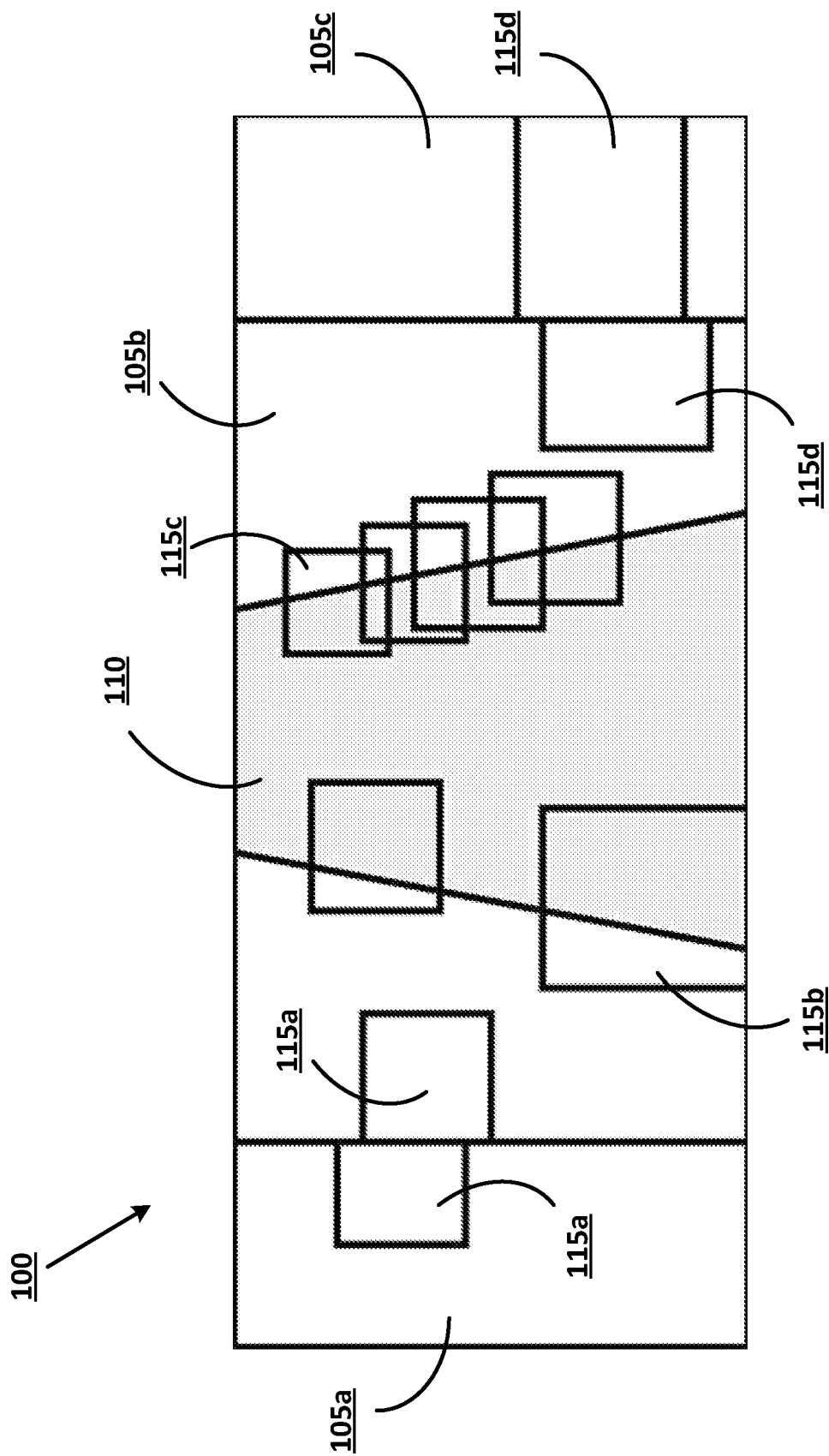
FIG. 1 depicts an example of an image strip, in accordance with various embodiments.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. Additionally, embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is helpful in understanding the claimed subject matter. However, the order of description should not be construed as to imply that these operations are necessarily order dependent.

As used herein, the term "module" may refer to, be part of, or include an application-specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

As noted above, maps of images at a given location may be taken using a variety of image capture technologies such as visible-light (or infrared or some other type of light spectrum) images, LIDAR, RADAR etc. For the sake of discussion herein, the light-spectrum image capture technology will generally be described with respect to a visible-light camera for the sake of succinctness, but it will be understood that other embodiments may relate to cameras that capture images in a different light spectrum. As noted, visible-light images and LIDAR or RADAR may provide different benefits such as the ability to pick out non-structural details such as colors or the ability to gauge distances. For the sake of description herein, embodiments may be described with respect to light spectrum and LIDAR images, however it will be understood that other embodiments may include different combinations such as light spectrum and RADAR, RADAR and LIDAR, a combination of the three, or including some other type of image capture technology.

In some embodiments, it may be desirable for a user to be able to receive the benefits of various of the image capture technologies. In one example use case, it may be desirable for a user to identify objects that are detected by one or both of the image capture technologies. For example, images may be taken of various outdoor locations such as city streets, and then the images may be provided to a user. The user may then identify various objects in the locations such as trees, vehicles, people, mailboxes, road signage, etc. The objects may be stored in a database which may then be provided to an autonomous vehicle (AV) to allow the AV to safely and effectively navigate the mapped location. In other embodiments, the objects may be used to produce annotated data which may be used to train machine learning models.

However, if the images are taken using the image capture technologies, it may be desirable to correlate objects that show up in the images provided by various of the image capture technologies. However, in legacy systems, users may be required to locate an object across both of the images provided by the different image capture technologies in order to confirm what the object is and assign a proper classification. This task may be challenging in legacy systems because the images provided by the LIDAR map may be independent from the images provided. Therefore, the object may have to be identified at least twice, for example once in each image, which may be tedious and prone to error.

By contrast, embodiments herein relate to systems which may allow for intuitive interaction patterns between one or more camera images and a LIDAR map, which may not only reduce identification time, but could also improve identification accuracy. Generally, embodiments herein relate to a GUI which may include images provided by the various image capture technologies. In some embodiments, the GUI may also be referred to as, or include, a "workspace." However, for the sake of consistency herein, the term GUI will be used to describe the structure through which images may be displayed or interacted with in some fashion as described herein. Objects in both images may be linked together such that identification of an object in one image may affect the other image. For example, interaction with an object in one image may cause various effects in another image such as highlighting of an object in the other image, zooming of the other image, rotation of the other image, rotation of an element of the other image, etc.

As a high-level example of embodiments herein, a sensing device such as a vehicle or some other device may capture a number of visible-spectrum images of a location. The images may be captured by a single camera that is rotating to capture different images, a panoramic camera, or a number of cameras that capture overlapping fields of view around the sensing device. The images may be laid side-by-side in a strip, which may also be referred to as an "image strip." In this embodiment, the image strip may offer a view of the location around the sensing device. The view may be, for example, a 360-degree view, or a subset thereof. Depending on the zoom level and the height allocated to the image strip, only a subset of the total image strip may be displayed to a user at one time. This subset may be referred to as a "vision field." A user may be able to rotate the vision field of the image strip to see different views of the location around the sensing device. Additionally or alternatively, a user may be able to zoom in or out of the vision field of the image strip.

FIG. 1 depicts an example of an image strip 100, in accordance with various embodiments. For the sake of this example, the various images will be described with respect to a sensing device at a location which is a city street. However, it will be understood that this description is intended as a non-limiting example for the sake of discussion, and embodiments may be applicable to other locations or settings such as an indoor setting, an outdoor setting, a microscopic setting, an endoscopic setting, etc.

Generally, it will be understood that FIG. 1, and other Figures herein such as FIGS. 2-10, are intended as highly simplified example embodiments of images of a location. However, embodiments may have certain inherent inconsistencies such as inconsistent perspective between Figures, inconsistent respective sizes of objects within the Figures, etc. It will be understood that, unless otherwise stated, the specific relative sizes or shapes of various objects or elements within the Figures, or the specific placement of the image overlap in Figures related to the image strip 100, may be depicted herein solely for the sake of example and discussion, and are not intended to be limiting or determinative. Rather, the objects and elements are depicted to provide examples of various operations that will be described with respect to the various Figures. It will also be noted that different images may include more or fewer objects or elements, or objects with different sizes or shapes than are depicted.

The image strip may be formed of a number of images 105*a*, 105*b*, 105*c* (collectively, "images 105"). For the sake of this representation, the images 105 may be separated by the depicted vertical lines, however in other embodiments the separation of the images 105 may have different boundaries, or no boundaries.

The images 105 may be, for example, images that are taken by the sensing device as described above. As noted, the images 105 may be considered to be a subset of the overall image strip, and may be referred to as a vision field of the overall image strip. More specifically, the sensing device may take more than the three depicted images 105*a*, 105*b*, and 105*c*. However, due to GUI-related settings such as the zoom level at which the image strip 100 is displayed, the height of the image strip 100, etc., not all of the images that make up the overall image strip may be displayed. Similarly, of the images that are displayed, the entirety of each image may not be displayed. This may be seen in, for example, images 105a and 105c which occupy a significantly smaller portion of the vision field of the image strip 100 than image 105b.

The image strip 100 may display a number of objects or elements. One such element may be, for example, a road 110. As noted, this particular example may be described with reference to a location on a city street. Therefore, the road 110 may be displayed with a perspective view as shown in FIG. 1. The image strip 100 may also include a number of objects 115a, 115b, 115c, and 115d (collectively, objects 115). The objects 115 may represent a variety of real-world physical objects which may be found on a city street such as trees, cars, people, mailboxes, light poles, etc.

As may be seen with respect to objects 115a and 115d, the same object may be present in two of the images of the image strip 100. For example, object 115a may be present in images 105a and 105b. Similarly, object 115d may be present in both images 105b and 105c. The objects 115a and 115d may not align perfectly at the boundary of the images 105 of which they are a part. This may be in part because the images may be taken from a specific angle with respect to the sensing device, and so the change in angle may result in a change of size, location, etc. of the object with respect to the captured image.

Similarly, some objects, for example object 115b, may appear larger than other objects such as object 115c. This may be because object 115b may be physically closer to the sensing device than object 115c.

As noted, another image capture technology may be LIDAR. The LIDAR information may be used to form a LIDAR map. The LIDAR map may be displayed as a top-down view of the location, and may be based on the LIDAR information captured by the sensing device. However, it will be noted that in other embodiments the LIDAR map may be from a different perspective (e.g. a three-dimensional map or some other type of depiction or perspective).

Figure 2:
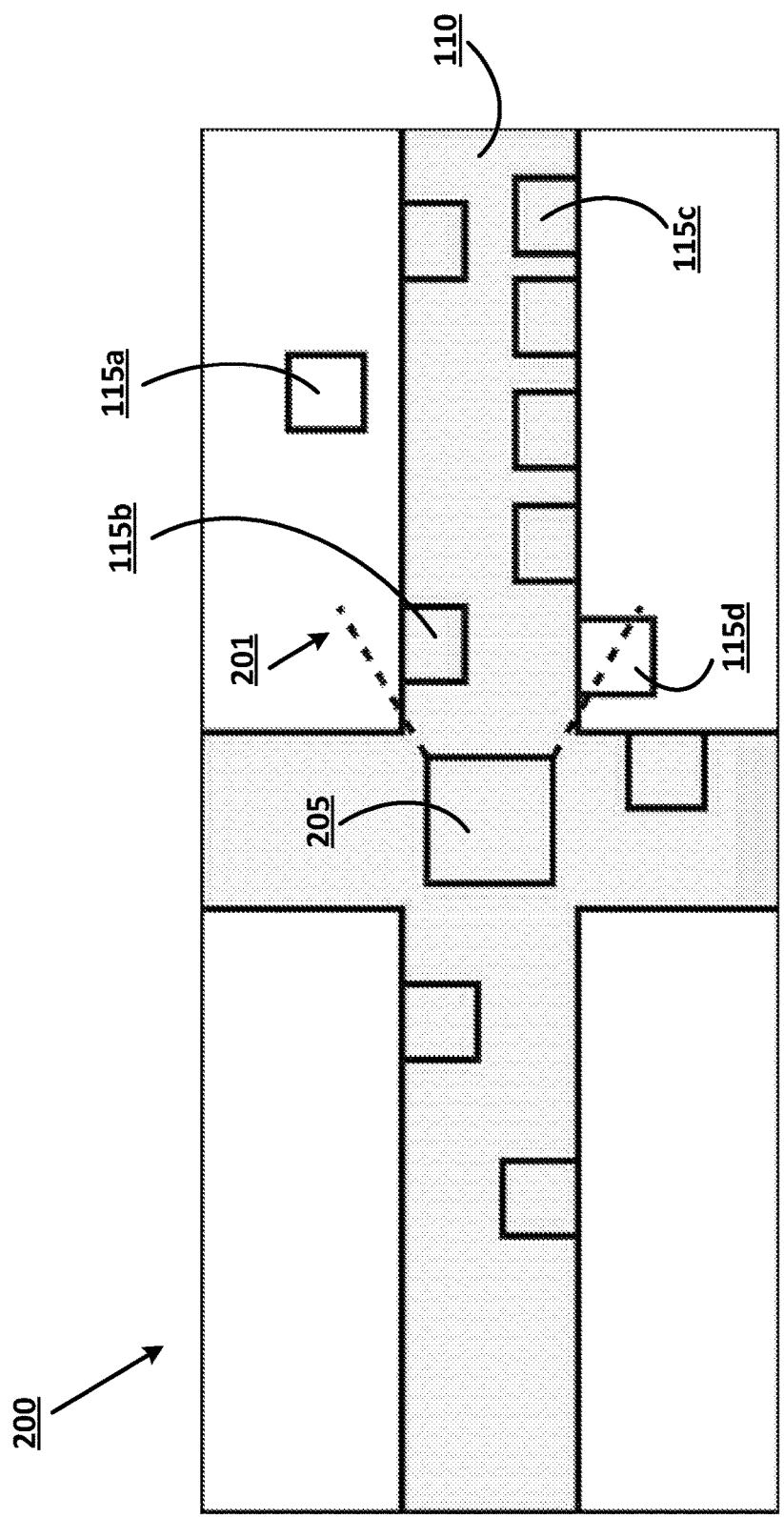
FIG. 2 depicts an example of a LIDAR map, in accordance with various embodiments.

FIG. 2 depicts an example of a LIDAR map 200, in accordance with various embodiments. Because the LIDAR map 200 is a representation of the same location as the location of the image strip 100, the LIDAR map 200 may include a variety of objects that are in the image strip 100. For example, the LIDAR map 200 may depict the road 110 and objects 115.

The LIDAR map 200 may depict additional elements to those depicted in the image strip 100. For example, as may be seen, the LIDAR map 200 may depict a graphical representation of the sensing device 205. The LIDAR map 200 may further depict a halo 201 (which may also be referred to as a "directional halo.") The halo 201 may be a graphical representation of the vision field of the image strip 100. For example, the halo 201 may depict a general sense of the direction of the vision field with respect to the sensing device 205, as well as the breadth of the vision field.

Figure 3:
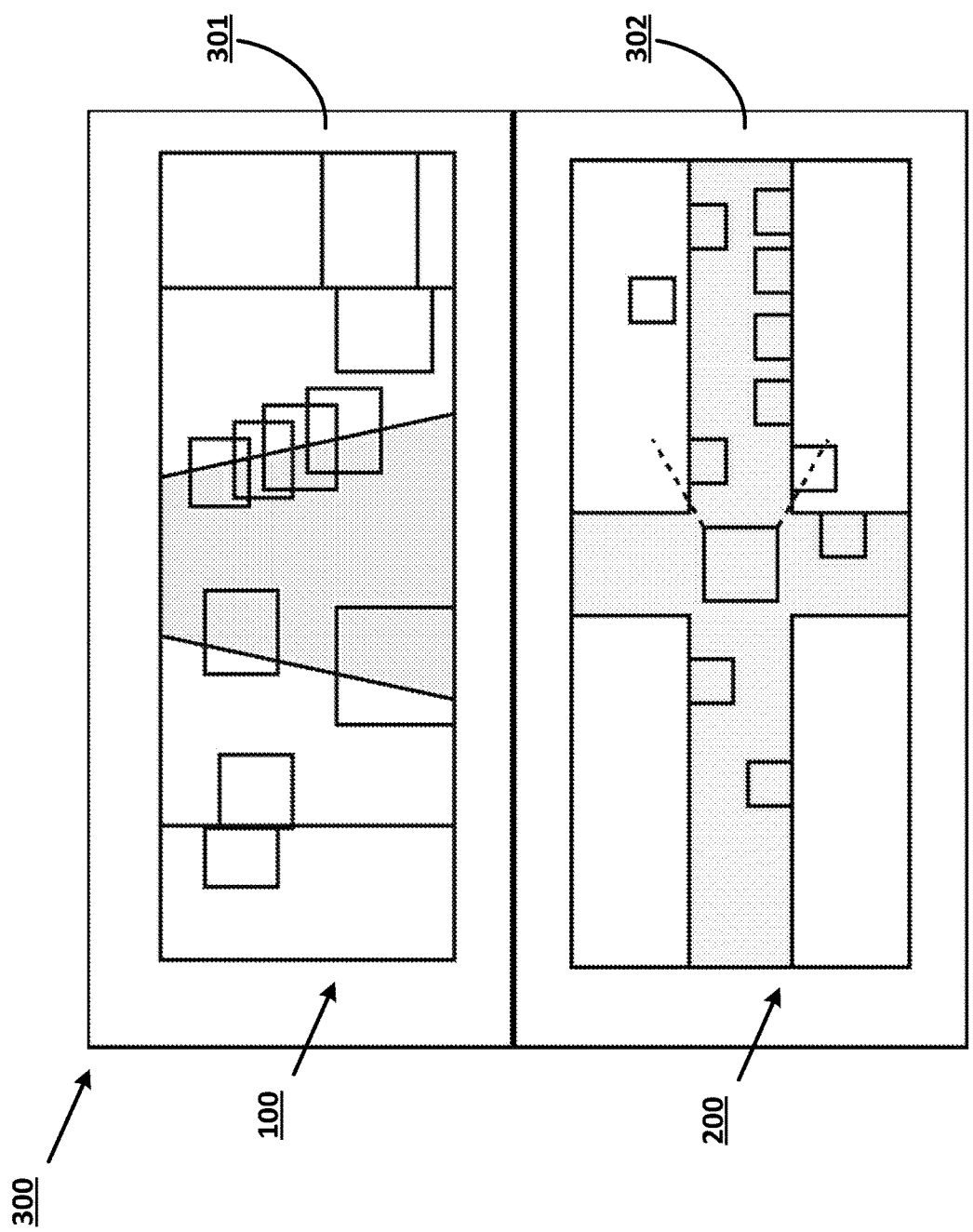
FIG. 3 depicts an example of a graphical user interface (GUI) that includes both an image strip and a LIDAR map, in accordance with various embodiments.

FIG. 3 depicts an example of a GUI 300 that includes both an image strip 100 and a LIDAR map 200, in accordance with various embodiments. Specifically, the GUI 300 may include a first GUI portion 301 and a second GUI portion 302. The image strip 100 may be displayed in the first GUI portion 301, and the LIDAR map 200 may be displayed in the second GUI portion 302. It will be understood that this depiction of the GUI 300 is only one example, and in other embodiments the positions of the LIDAR map 200 and the image strip 100 may be switched, the image strip 100 and LIDAR map 200 may be adjacent to each other, etc. Similarly, in some embodiments the relative sizes of the first GUI portion 301 and the second GUI portion 302 may be different than depicted. For example, in some embodiments the first GUI portion 301 may make up the majority of the GUI 300 if, for example, interaction with the image strip 100 was currently prioritized or desired. Similarly, in some embodiments the second GUI portion 302 may make up the majority of the GUI 300 if, for example, interaction with the LIDAR map 200 was currently prioritized or desired. Additionally, it will be understood that the relative sizes of the image strip 100 and LIDAR map 200, the degree to which the image strip 100 and LIDAR map 200 fill their respective GUI portions 301/302, etc. may be different in different embodiments. It will also be understood that the GUI 300 is intended as a highly simplified example GUI, and additional GUI elements such as sliders, menus, etc. are omitted from FIG. 3 for the sake of clarity of the Figure.

Because the image strip 100 and the LIDAR map 200 may be depicted in the same GUI 300, a user's interactions with one of the image strip 100 and the LIDAR map 200 may affect the other of the image strip 100 and the LIDAR map 200. As used herein, a user's interaction may refer to actions that may be taken via a touchscreen, an input device such as a mouse or keyboard, etc. The actions may be actions such as hovering over an object 115 in the image strip 100 or the LIDAR map 200, clicking on an object 115, double-clicking on an object, right-clicking on an object, capturing the object in a selection box or selection lasso, etc.

Figure 4:
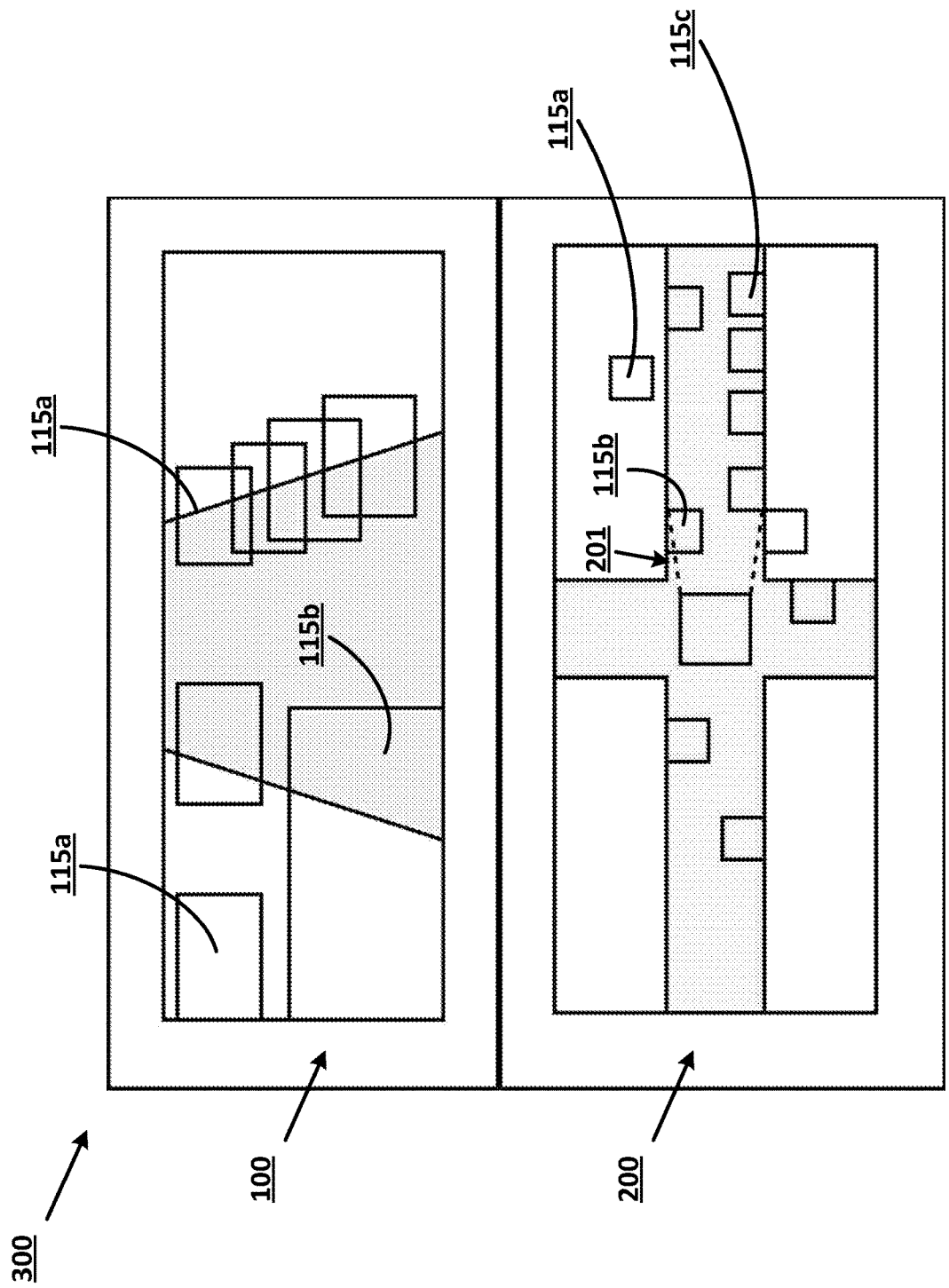
FIG. 4 depicts an alternative example of a GUI that includes both an image strip and a LIDAR map, in accordance with various embodiments.

FIG. 4 depicts one such interaction, wherein zooming in on an object or location of the image strip 100 may narrow or otherwise alter the breadth of the vision field, and therefore narrow or otherwise alter the breadth of the halo 201 of the LIDAR map. Specifically, FIG. 4 depicts an alternative example of a GUI 300 that includes both an image strip 100 and a LIDAR map 200, in accordance with various embodiments. As may be seen by comparison of FIG. 4 to FIG. 3, the displayed image in FIG. 4 may be different than the displayed image of FIG. 3. Specifically, FIG. 4 depicts the GUI 300 in the instance wherein a user may have zoomed in on a point of the image strip 100. Therefore, elements of the image strip 100 may be displayed differently than depicted, for example, in FIG. 3. Specifically, the image strip 100 may only display elements of image 105b rather than images 105a-c as depicted in FIG. 3. Additionally, the elements of the image strip 100 (e.g., objects 115a, 115, or 115c) may be larger in FIG. 4 than in FIG. 3.

The zoom-type interaction of the image strip 100 of FIG. 4 may cause a resultant change to the LIDAR map 200. Specifically, as may be seen the halo 201 in the LIDAR map 200 may be narrower than the halo 201 of FIG. 3. This narrowed halo 201 may be because the zoom interaction may narrow the vision field of the image strip 100. It will be understood that in a different example the interaction may, rather than a zoom-in type interaction, be a zoom-out type interaction wherein the halo 201 may be broadened.

Figure 5:
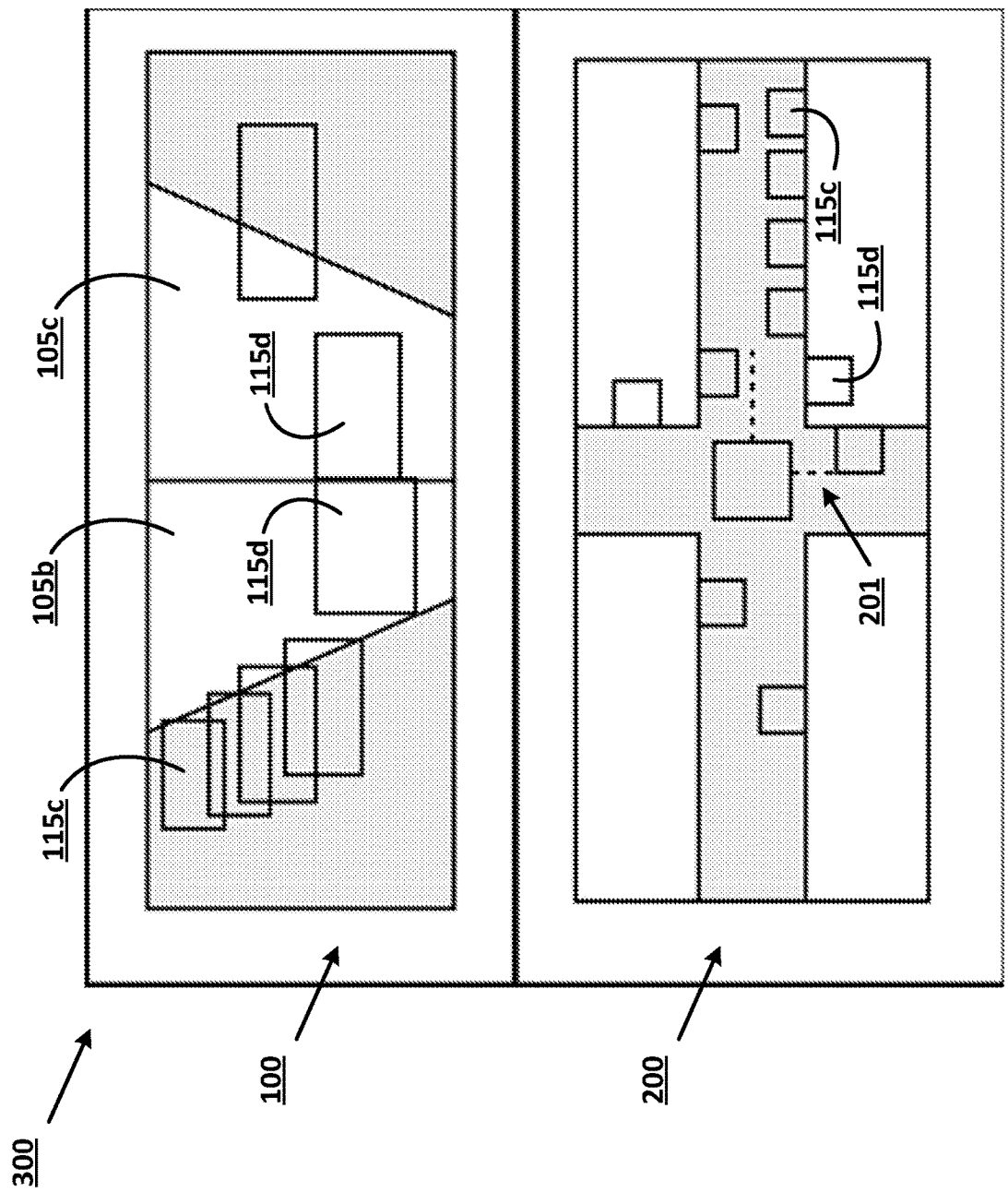
FIG. 5 depicts an alternative example of a GUI that includes both an image strip and a LIDAR map, in accordance with various embodiments.

FIG. 5 depicts another such interaction, wherein the vision field may be rotated to show a different view of the location in general and the image strip 100 in particular. Specifically, FIG. 5 depicts an alternative example of an GUI 300 that includes both an image strip 100 and a LIDAR map 200, in accordance with various embodiments. As used herein, "rotating" the vision field of the image strip 100 may refer to a user interaction wherein the vision field of the image strip 100 is laterally or vertically moved to display different images, or different portions of an image. This may be accomplished by, for example, clicking and dragging on the image strip 100, movement of a slider of the GUI 300, or some other type of interaction.

FIG. 5 depicts such a rotation of the vision field. As can be seen by comparison with FIG. 3, the vision field of the image strip 100 of FIG. 5 may only include images 105*b* and 105*c* rather than the images 105*a*, 105*b*, and 105*c* that are viewable in FIG. 3. Additionally, it may be noted that a greater portion of the image 105*c* may be displayed in FIG. 5 than is displayed in FIG. 3. As a result of the rotation of the vision field of the image strip 100, the halo 201 may rotate as shown in the LIDAR map 200 of FIG. 5.

Figure 6:
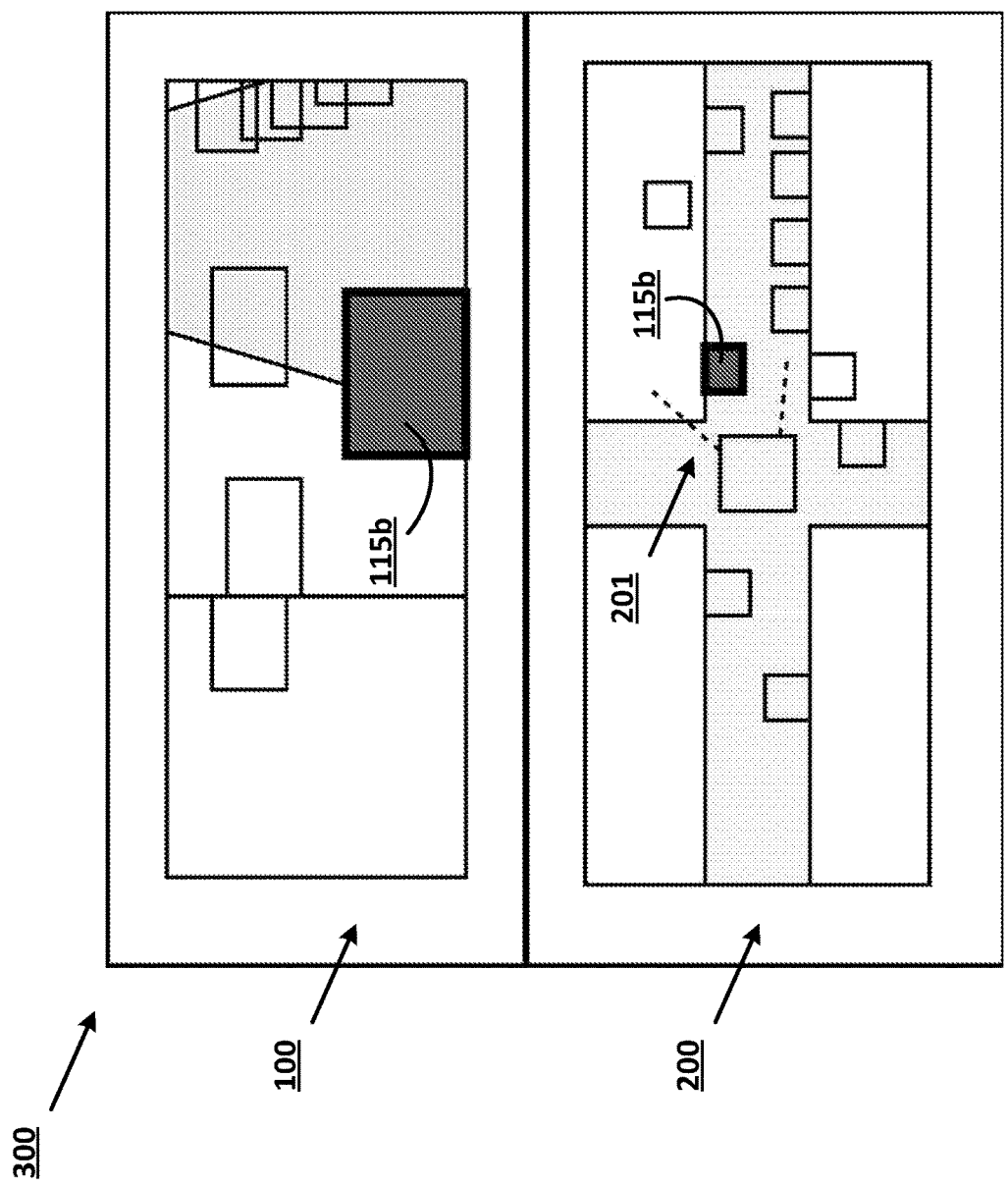
FIG. 6 depicts an alternative example of a GUI that includes both an image strip and a LIDAR map, in accordance with various embodiments.

In some embodiments, selection of an object, element, or area of the image strip 100 may cause a change to both the image strip and the LIDAR map 200. For example, in some embodiments, selection of an object, element, or area of the image strip 100 may cause both a zoom effect as described with respect to FIG. 4 and a rotation effect as described with respect to FIG. 5. FIG. 6 depicts such a scenario. Specifically, FIG. 6 depicts an alternative example of a GUI that includes both an image strip and a LIDAR map, in accordance with various embodiments.

In the example of FIG. 6, a user may have selected the object 115*b* in the image strip 100. As a result, one or more changes may occur to one or both of the image strip 100 and the LIDAR map 200. One such change may be that the object 115*b* may change color, shading, or otherwise be highlighted or accentuated in some form as depicted in FIG. 6. Another such change may be that the vision field of the image strip 100 may be narrowed as may be seen by comparison of FIG. 6 with FIG. 3. The halo 201 of the LIDAR map 200 may be similarly narrowed. Such a narrowing may be the result of a "zoom" as described above with respect to FIG. 4. Additionally, the vision field of the image strip 100 may be rotated in a manner similar to that described above with respect to FIG. 5. Such a rotation may be seen by comparison of the GUI 300 of FIG. 6 with the GUI 300 of FIG. 3.

It will be understood that, in some embodiments, interactions with the LIDAR map 200 may likewise affect the image strip 100. For example, rather than a user selecting the object 115*b* in the image strip 100 in FIG. 6, the user may select the object 115*b* in the LIDAR map 200. Selection of the object 115*b* in the LIDAR map 200 may result in the vision field of the image strip 100 rotating and/or zooming as depicted in FIG. 6. In some embodiments, the rotation and zoom effect may occur if the user selects an area of the LIDAR map 200 rather than a specific object. Other variations may be present in other embodiments.

Figure 7:
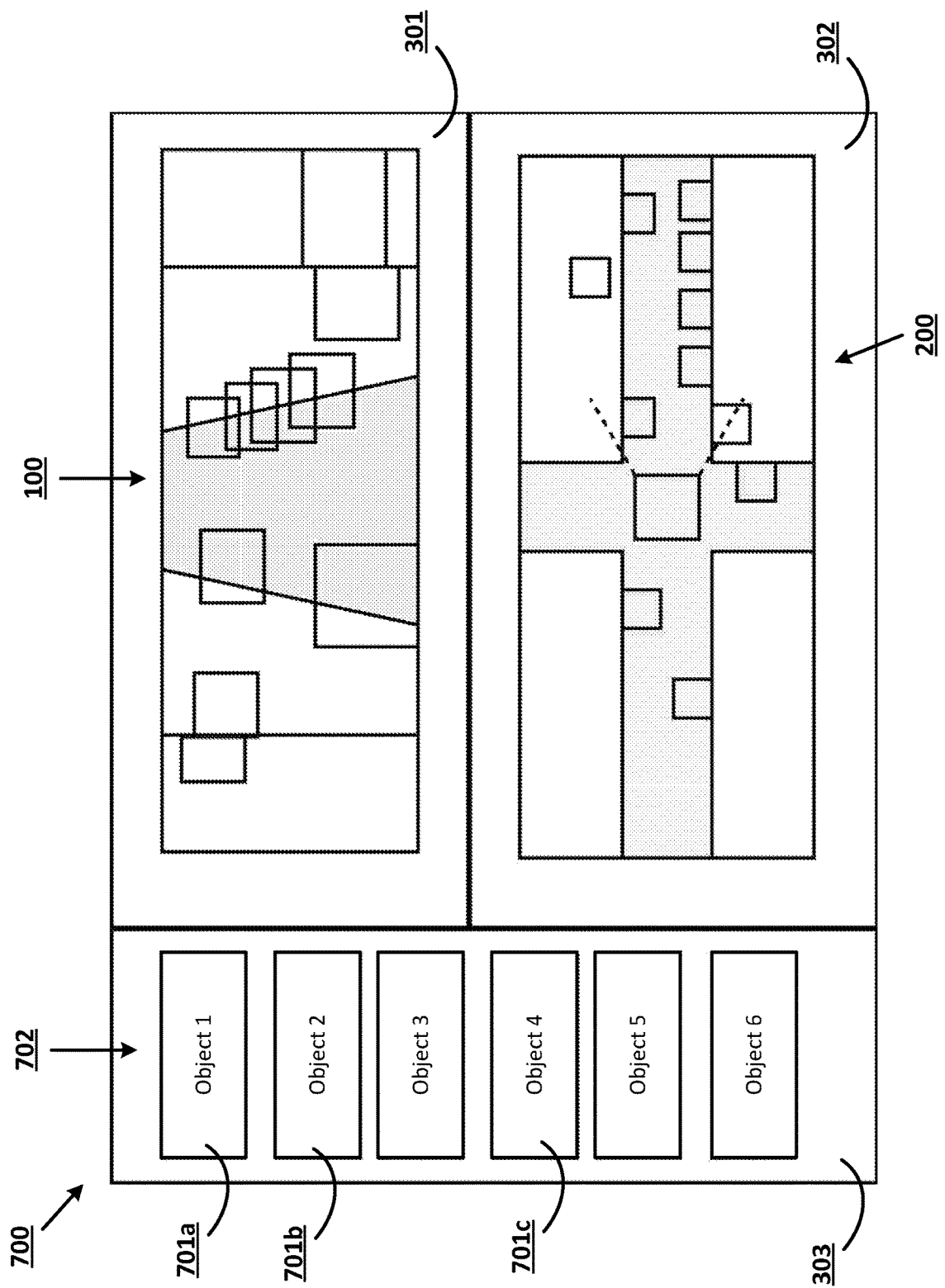
FIG. 7 depicts an example of a GUI that includes an object list, an image strip, and a LIDAR map, in accordance with various embodiments.

In some embodiments the GUI may include additional GUI portions. FIG. 7 depicts an example GUI 700 that includes both the image strip 100 and the LIDAR map 200, as well as an object list 702. Specifically, FIG. 7 depicts an example of a GUI 700 that includes an object list 702, an image strip 100, and a LIDAR map 200, in accordance with various embodiments.

As can be seen in FIG. 7, the GUI 700 may be similar to GUI 300, and include elements similar to those of GUI 300. For example, the GUI 700 may include an image strip 100 in the GUI portion 302, and a LIDAR map 200 in the GUI portion 302. The GUI 700 may further include a third GUI portion 303, which may include an object list 702. The object list 702 may include a number of entries such as objects 701*a*, 701*b*, 701*c*, etc. (collectively, "objects 701"). Each of the objects 701 may correspond to one of objects 115 of the image strip 100 and the LIDAR map 200. For example, interaction with one of the objects 701 may cause a change in the image strip 100 or the LIDAR map 200, or vice versa.

It will be understood that the particular size and shape of the objects 701 in the object list 702 is depicted as an example, and in other embodiments the object list 702, or the objects 701 therein, may have a different size, shape, or arrangement. The object list 702 may be arranged in the form of a list, as depicted, whereas in the other embodiments the object list 702 may be arranged in a tile form, a drop-down menu, or some other form. Additionally, the relative positioning, shape, or size of the GUI portions 301/302/303 may be different in different embodiments.

Additionally, the text "object 1," "object 2," etc. is intended as placeholder text and in different embodiments, the text of the respective objects may be replaced by a label related to the type, the placement, the size, the color, etc. of the object such as "tree—large," "car," "mailbox—blue," "car—close," "male," "human," or some other type of label. In some embodiments, the label may be a unique identifier of the object, for example a function of the object class. In some embodiments, the label may include metadata such as information about the physical object (e.g. its class or size), or information about where the object appears in the GUI 700. Other variations may be present.

Figure 8:
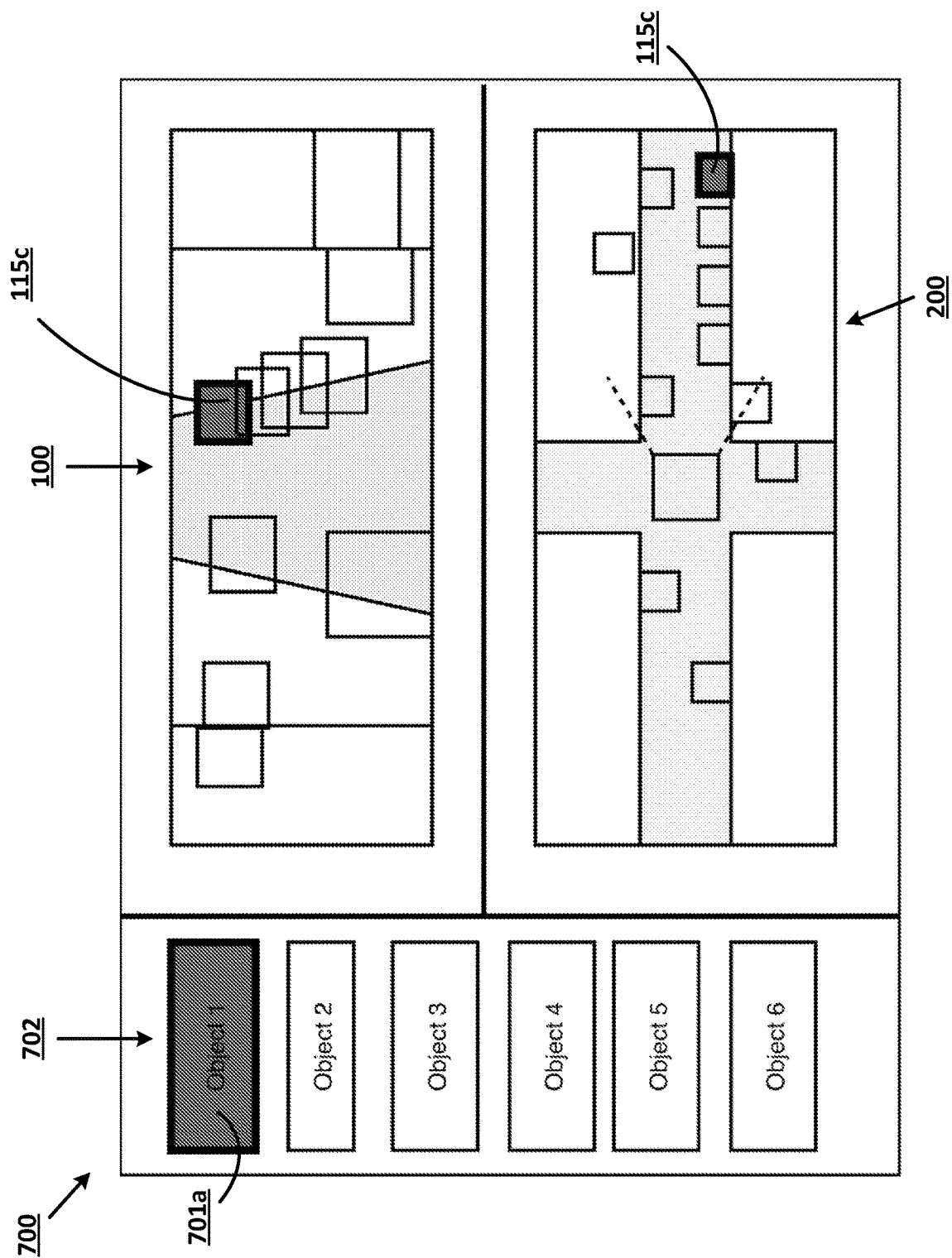
FIG. 8 depicts an alternative example of a GUI that includes an object list, an image strip, and a LIDAR map, in accordance with various embodiments.

FIG. 8 depicts an alternative example of a GUI that includes an object list, an image strip, and a LIDAR map, in accordance with various embodiments. Specifically, FIG. 8 depicts one example interaction between the object list, the image strip, and the LIDAR map. As may be seen, a user may interact with object 701*a*. The interaction may be, for example, hovering over object 701*a*, clicking on object 701*a*, double-clicking on object 701*a*, etc. The interaction may cause a change to the graphical display of the object 701*a*. The change to the graphical display may, for example, help to confirm the interaction (e.g., indicate to the user that the object 701*a* has been interacted with.) The change may be, for example by changing the color of the object 701*a*, highlighting object 701*a*, etc.

Additionally, by interacting with the object 701*a*, a change may be affected to an object of the image strip 100 or the LIDAR map 200 such as object 115*c*. In this example, as may be seen in FIG. 8, object 115*c* may be highlighted. In this way, by interacting with object 701*a*, a user may be able to identify that object 701*a* corresponds to object 115*c*, and identify where object 115*c* is located in one or both of the image strip 100 and the LIDAR map 200.

It will be understood that although the example of FIG. 8 is described with respect to an interaction to the object list 702 affecting a change to the image strip 100 and the LIDAR map 200, in other embodiments an interaction with the image strip 100 may similarly affect the object list 702 and the LIDAR map 200, or an interaction with the LIDAR map 200 may affect the object list 702 and the image strip 100. For example, if a user were to interact with object 115*c* (e.g., by hovering over the object 115*c*, clicking on the object 115*c*, etc.) then the object 115*c* may be highlighted or otherwise accentuated in one or both of the image strip 100 and the LIDAR map 200, and the object 701*a* may likewise be highlighted or otherwise accentuated.

Figure 9:
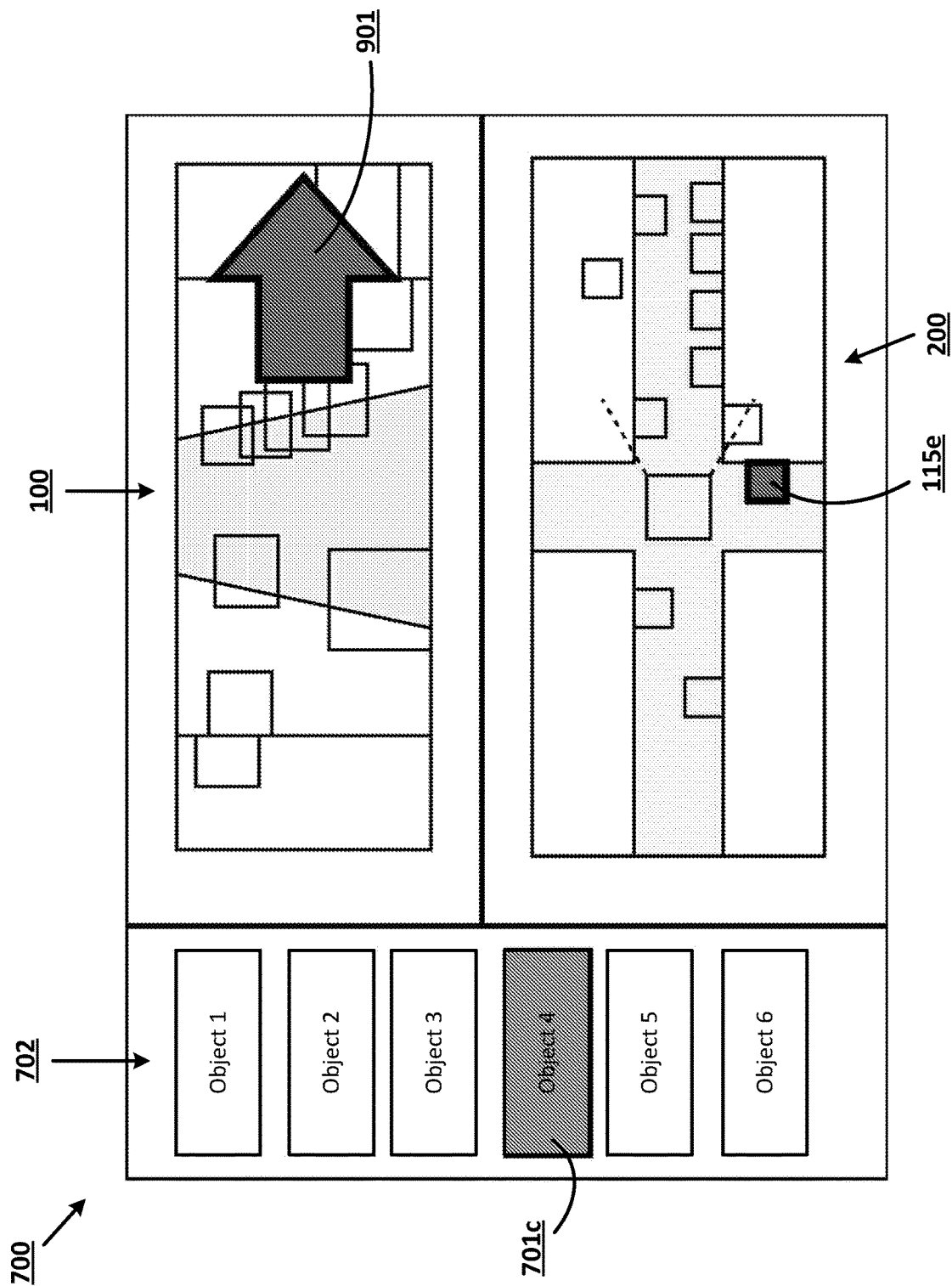
FIG. 9 depicts an alternative example of a GUI that includes an object list, an image strip, and a LIDAR map, in accordance with various embodiments.

In some embodiments, a user may interact with an object that is not visible in, for example, the vision field of the image strip 100. In these embodiments, an indicator may be desirable to indicate to the user where the relevant object may be located in the image strip 100. FIG. 9 depicts an example of a GUI with such an indicator. Specifically, FIG.

9 depicts an alternative example of a GUI 700 that includes an object list 702, an image strip 100, and a LIDAR map 200, in accordance with various embodiments.

In this embodiment, object 701*c* may correspond to object 115*e* (which may be similar to, and share one or more characteristics with, one or more of the other objects 115) as shown in the LIDAR map 200. However, as indicated by the halo 201 of the LIDAR map 200, the object 115*e* may not be in the vision field of the image strip 100. Therefore, an indicator 901 may be present which may inform a user of the location of the object 115*e* within the image strip 100, and further inform the user that they should rotate the vision field of the image strip 100 to display the object 115*e*. In some embodiments, the indicator 901 may only appear during an interaction such as a hover over object 701*c*. In this embodiment, a further interaction such as a click on object 701*c* may cause a change to the vision field of the image strip 100 such that object 115*e* would be visible. However, in other embodiments the indicator 901 may occur based on other interactions with the object 701*c*.

It will be understood that although the indicator 901 is depicted as a relatively large arrow, in other embodiments the indicator 901 may take another form such as a smaller arrow, a flash at the periphery of the image strip 100. Similarly, it will be understood that interaction with the object 115*e* in the LIDAR map 200 may likewise cause the indicator 901 to appear for the convenience of the user. Finally, it will be understood that the indicator 901 may be present in another GUI such as GUI 300 where, for example, the object list 702 may not be present. Other variations may be present in other embodiments.

Figure 10:
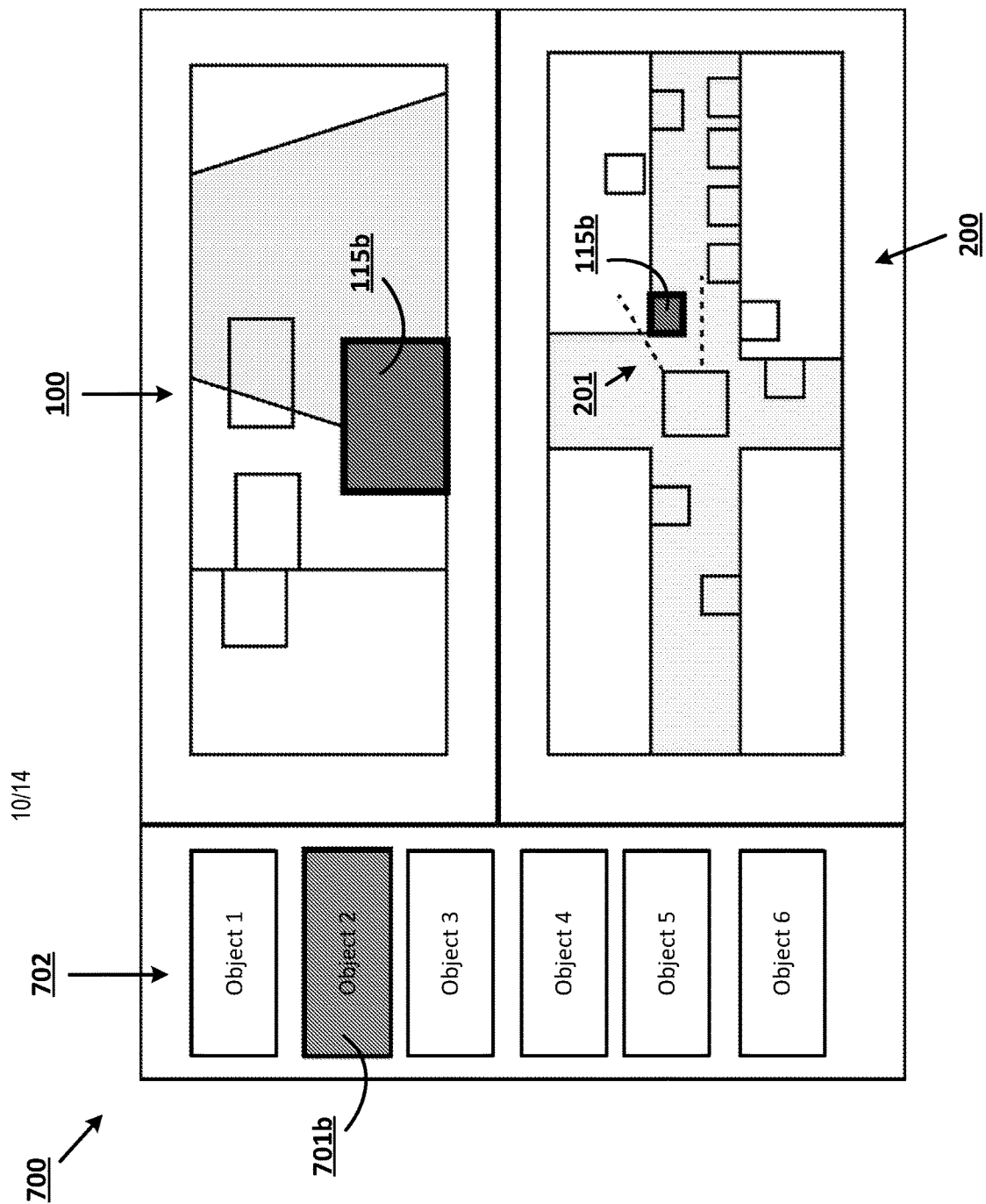
FIG. 10 depicts an alternative example of a GUI that includes an object list, an image strip, and a LIDAR map, in accordance with various embodiments.

FIG. 10 depicts another example wherein an interaction with an object in one of the portions of the GUI 700 may affect a change in another portion of the GUI 700. More specifically, FIG. 10 depicts an alternative example of a GUI 700 that includes an object list 702, an image strip 100, and a LIDAR map 200, in accordance with various embodiments.

In FIG. 10, a user may interact with object 701*b*. For example, the user may click on the object 701*b*, double-click on the object 701*b*, or interact with the object 701*b* in some other manner. In response, the vision field of the image strip 100 may perform one or both of a zoom action (as described with respect to, for example, FIG. 4) or a rotation of the vision field of the image strip 100 (as described with respect to, for example, FIG. 5). The zoom and rotation may have the effect of centering the object 115*b* in the vision field of the image strip 100. Similarly, the halo 201 of the LIDAR map 200 may be rotated and narrowed as shown in FIG. 10. In addition, one or more of the objects 115*b* in the image strip 100 or the LIDAR map 200, and the object 701*b* in the object list 702, may be highlighted or otherwise accentuated as shown in FIG. 10.

Generally, embodiments have been described herein for the sake of illustrating specific concepts such that different functions or interactions may be discussed or described. It will be understood that real-world embodiments may combine aspects of various of the embodiments herein. For example, various embodiments may combine the rotation function, highlighting function, zoom function, actions upon hover, actions upon click, etc. that are described herein. Other embodiments may likewise have additional functions or elements than are depicted or discussed herein, or may not include one or more of the functions or elements that are depicted or discussed herein. Other variations may be present in other embodiments.

Figure 11:
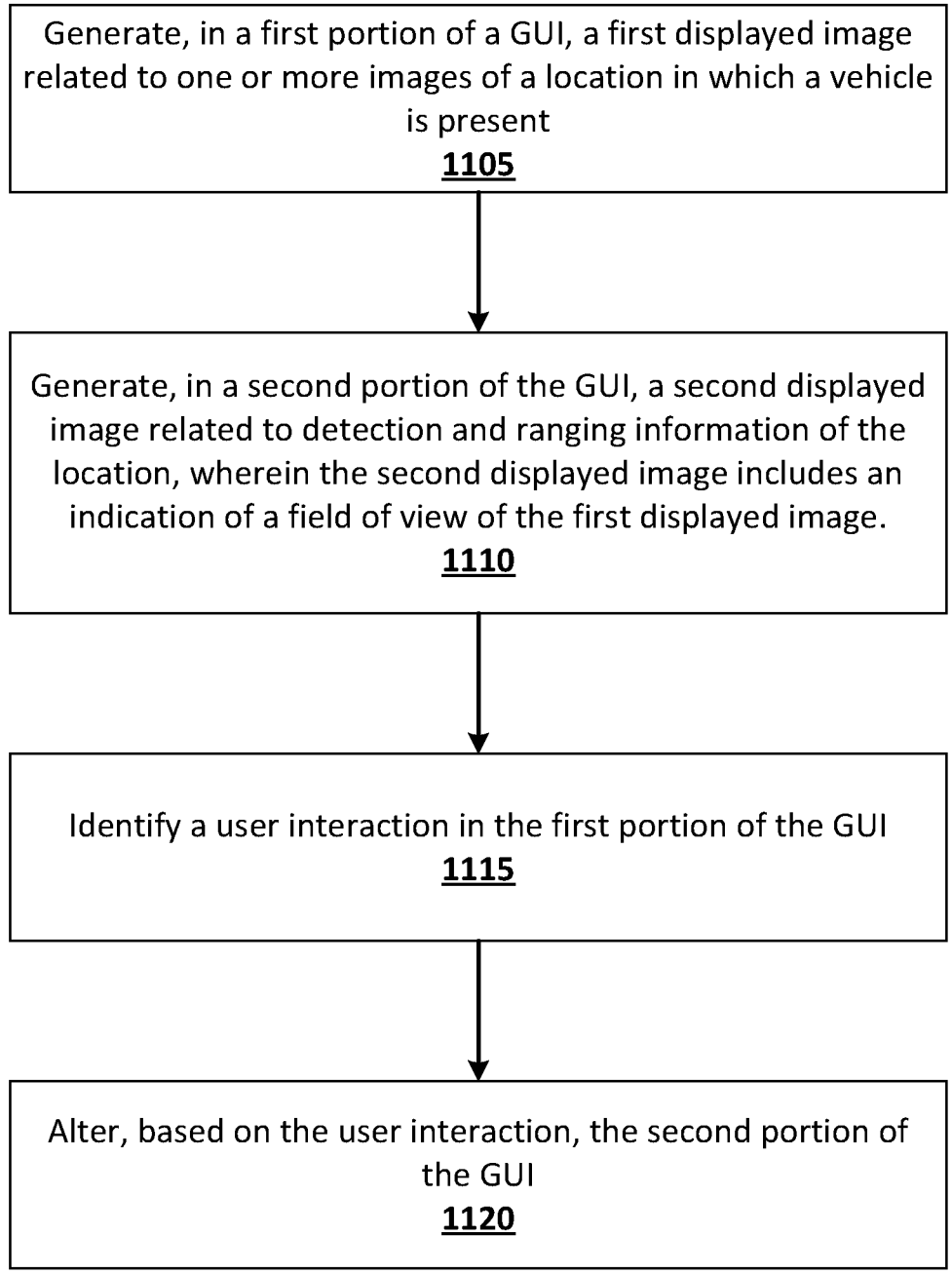
FIG. 11 depicts an example technique by which a GUI that includes an image strip and a LIDAR map may be operated, in accordance with various embodiments.
Figure 12:
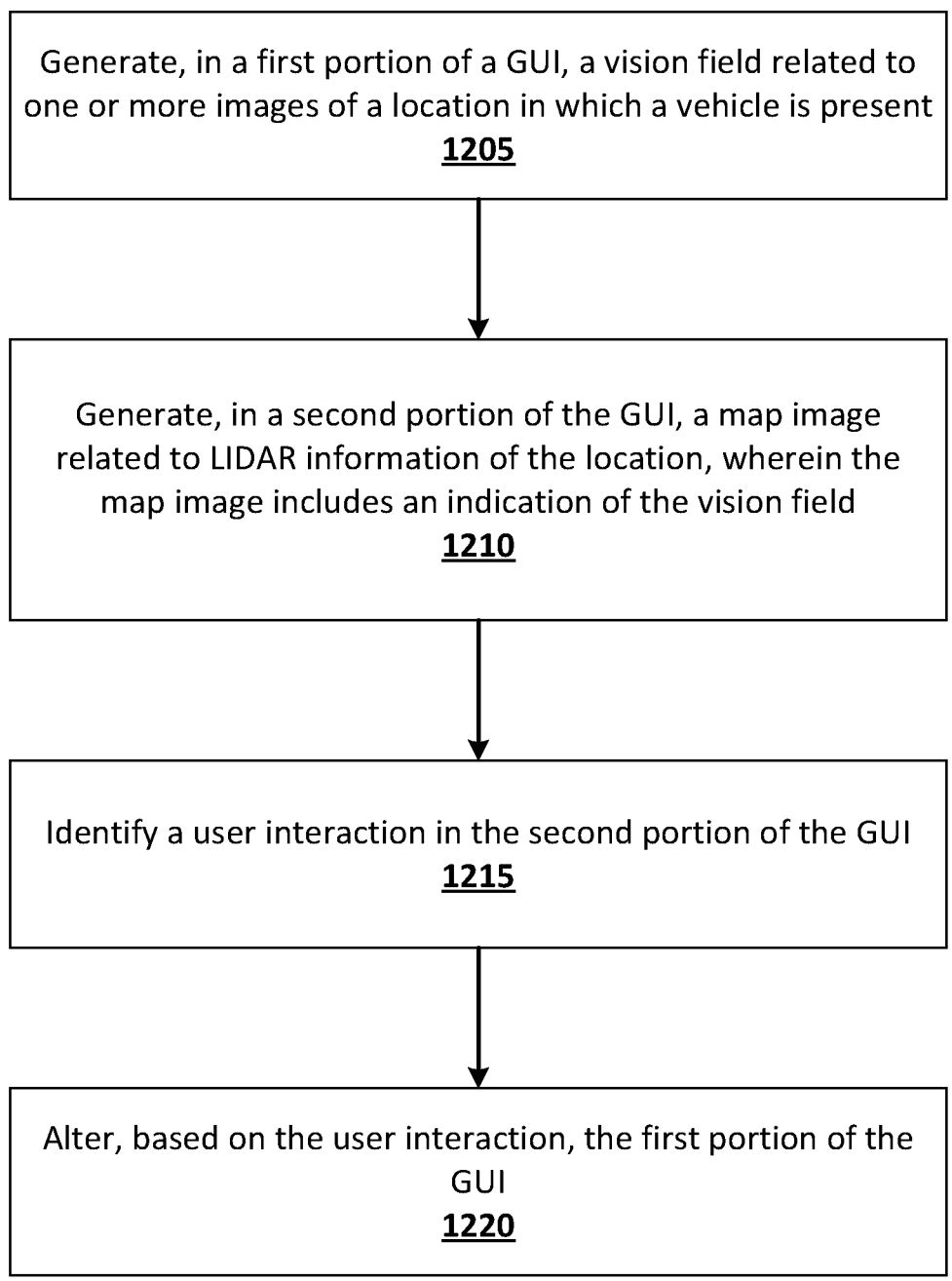
FIG. 12 depicts an alternative example technique by which a GUI that includes an image strip and a LIDAR map may be operated, in accordance with various embodiments.
Figure 13:
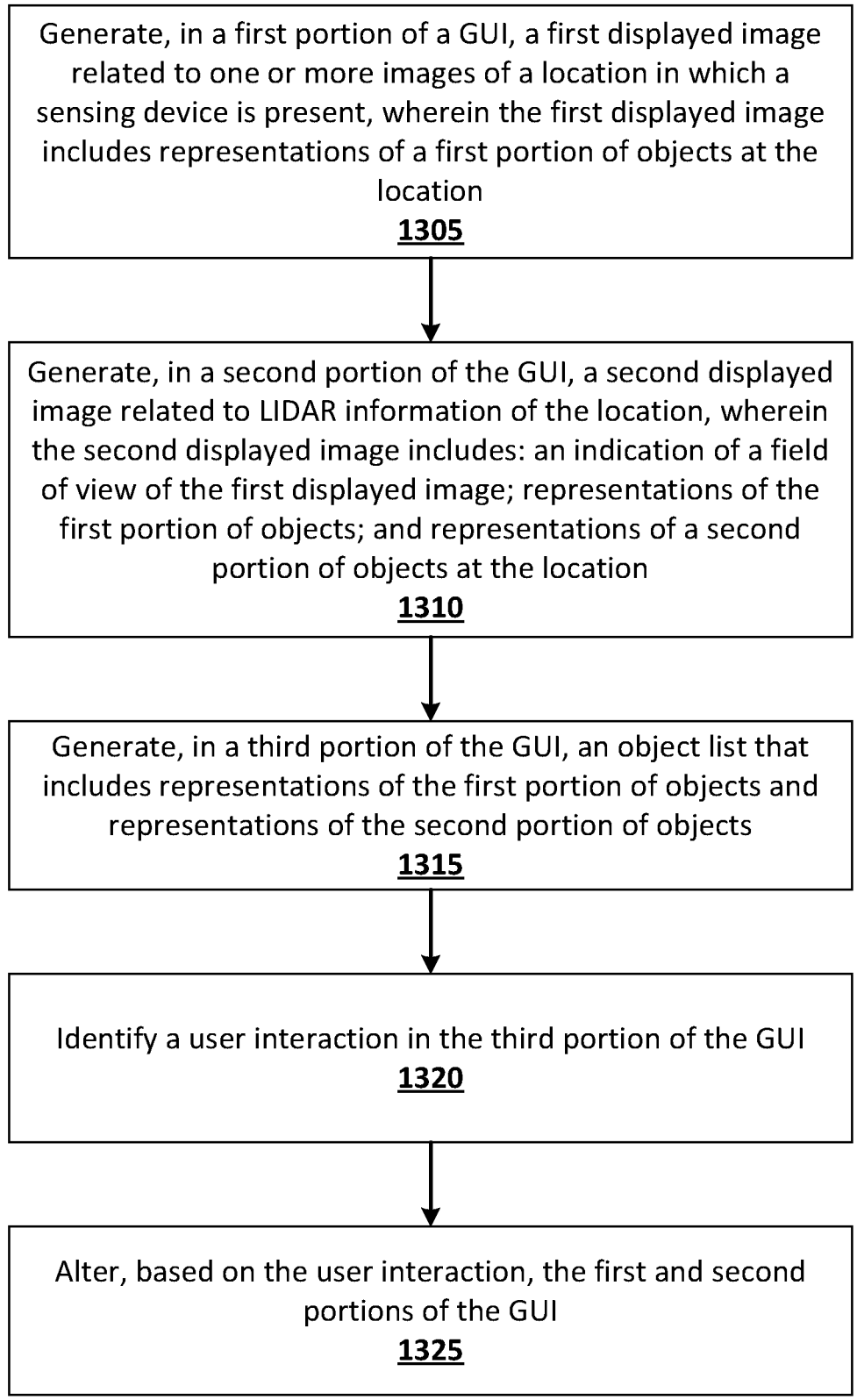
FIG. 13 depicts an example technique by which a GUI that includes an object list, an image strip, and a LIDAR map may be operated, in accordance with various embodiments.

FIG. 11 depicts an example technique by which a GUI that includes an image strip and a LIDAR map may be operated, in accordance with various embodiments. Generally, FIGS. 11 and 12 may be described with respect to the GUI 300, however it will be understood that in other embodiments the techniques of FIG. 11 or 12 may be applicable, in whole or in part, with or without modification, to another GUI that is consistent with the present disclosure. Similarly, FIG. 13 may be described with respect to GUI 700, however it will be understood that in other embodiments the technique of FIG. 13 may be applicable, in whole or in part, with or without modification, to another GUI that is consistent with the present disclosure. It will further be understood that FIG. 11-13 are intended as highly simplified example techniques and, in other embodiments, the techniques may include more or fewer elements than are depicted in FIG. 11-13. Additionally, elements of FIG. 11-13 may be performed in a different order than depicted, or concurrently with one another, in other embodiments.

The technique of FIG. 11 includes generating, at 1105, in a first portion of a GUI, a first displayed image related to one or more images of a location in which a vehicle is present. The first portion of the GUI may be similar to, for example, portion 301 of GUI 300, and the displayed image may be similar to the image strip 100. The one or more images of the location may be similar to, for example, images 105.

The technique may further include generating, at 1110, in a second portion of the GUI, a second displayed image related to detection and ranging (e.g., LIDAR or RADAR) information of the location. The second portion of the GUI may be similar to, for example, portion 302, and the second displayed image may be the LIDAR map 200. The second displayed image may include an indication of a field of view of the first displayed image which may be, for example, the halo 201.

The technique may further include identifying, at 1115, a user interaction in the first portion of the GUI. The user interaction may be, for example, a click, a double-click, a hover, a lasso or other type of mass selection, or some other way by which the user may interact with the GUI 300. As noted, the interaction may be performed by way of a touchscreen, a mouse, or some other type of input device.

The technique may further include altering, at 1120, based on the user interaction, the second portion of the GUI. Such an alteration may include highlighting an object in the LIDAR map 200, rotating the halo 201, changing the breadth of the halo 201, or some other type of alteration.

FIG. 12 depicts an alternative example technique by which a GUI that includes an image strip and a LIDAR map may be operated, in accordance with various embodiments.

The technique of FIG. 12 may include generating, at 1205, in a first portion of a GUI, a vision field related to one or more images of a location in which a vehicle is present. The first portion of the GUI may be similar to, for example, portion 301 of GUI 300. The vision field may be the displayed portion of the image strip 100 as described above.

The technique may further include generating, at 1210, in a second portion of the GUI, a map image related to LIDAR information of the location, wherein the map image includes an indication of the vision field. The second portion of the GUI may be, for example, portion 302. The map image may be the LIDAR map 200, and the indication of the vision field may be, for example, halo 201.

The technique may further include identifying, at 1215, a user interaction in the second portion of the GUI. The user interaction may be, for example, selection of an object or an area in the LIDAR map 200, hovering over an object in the LIDAR map 200, etc.

The technique may further include altering, at 1220, based on the user interaction, the first portion of the GUI. For example, the alteration may include zooming the image strip 100, rotation of the vision field of the image strip 100, highlighting an object in the image strip 100, etc.

FIG. 13 depicts an example technique by which a GUI that includes an object list, an image strip, and a LIDAR map may be operated, in accordance with various embodiments. As noted previously, FIG. 13 may be described with respect to GUI 700.

The technique of FIG. 13 may include generating, at 1305, in a first portion of a GUI, a first displayed image related to one or more images of a location in which a sensing device is present. The first portion of the GUI may be, for example, portion 301 of GUI 700, and the first displayed image may be the image strip 100. The one or more images of the location may be, for example, images 105 as previously described. The first displayed image may include representations of a first portion of objects at the location. The first portion of objects may be, for example, objects 115a-115d as described above with respect to FIG. 1. More generally, the location may include a number of objects at the location, as may be seen in the various depictions of the LIDAR map 200, however only a portion of those objects may be visible in the vision field of the image strip 100 at a given time.

The technique may further include generating, at 1310, in a second portion of the GUI, a second displayed image related to LIDAR information of the location. The second portion of the GUI may be portion 302, and the second displayed image may be the LIDAR map 200. The second displayed image may include an indication of a field of view of the first displayed image, which may be the halo 201. The second displayed image may further include representations of the first portion of objects, which may be objects 115a-115d of the LIDAR map 200. The second displayed image may further include a representation of a second portion of objects at the location which may include, for example, object 115e. Specifically, in the embodiment of FIG. 9, the object 115e (as discussed with respect to FIG. 9) may be located outside of the vision field of the image strip 100 and, subsequently, outside of the halo 201.

The technique may further include generating, at 1315, in a third portion of the GUI (e.g., portion 303) an object list such as object list 702. The object list may include representations of the first portion of the objects (e.g., objects 701a and 701b) and representations of the second portion of the objects (e.g., objects 701c).

The technique may further include identifying, at 1320, a user interaction in the third portion of the GUI. The user interaction may be, for example, clicking on an object in the object list, hovering over an object in the object list, double-clicking an object in the object list, etc.

The technique may further include altering, at 1325, based on the user interaction, the first and second portions of the GUI. The alteration may include rotating or zooming the image strip 100, rotating or changing the breadth of the halo 201, highlighting or otherwise accentuating an object in the image strip 100 or the LIDAR map 200, etc.

Figure 14:
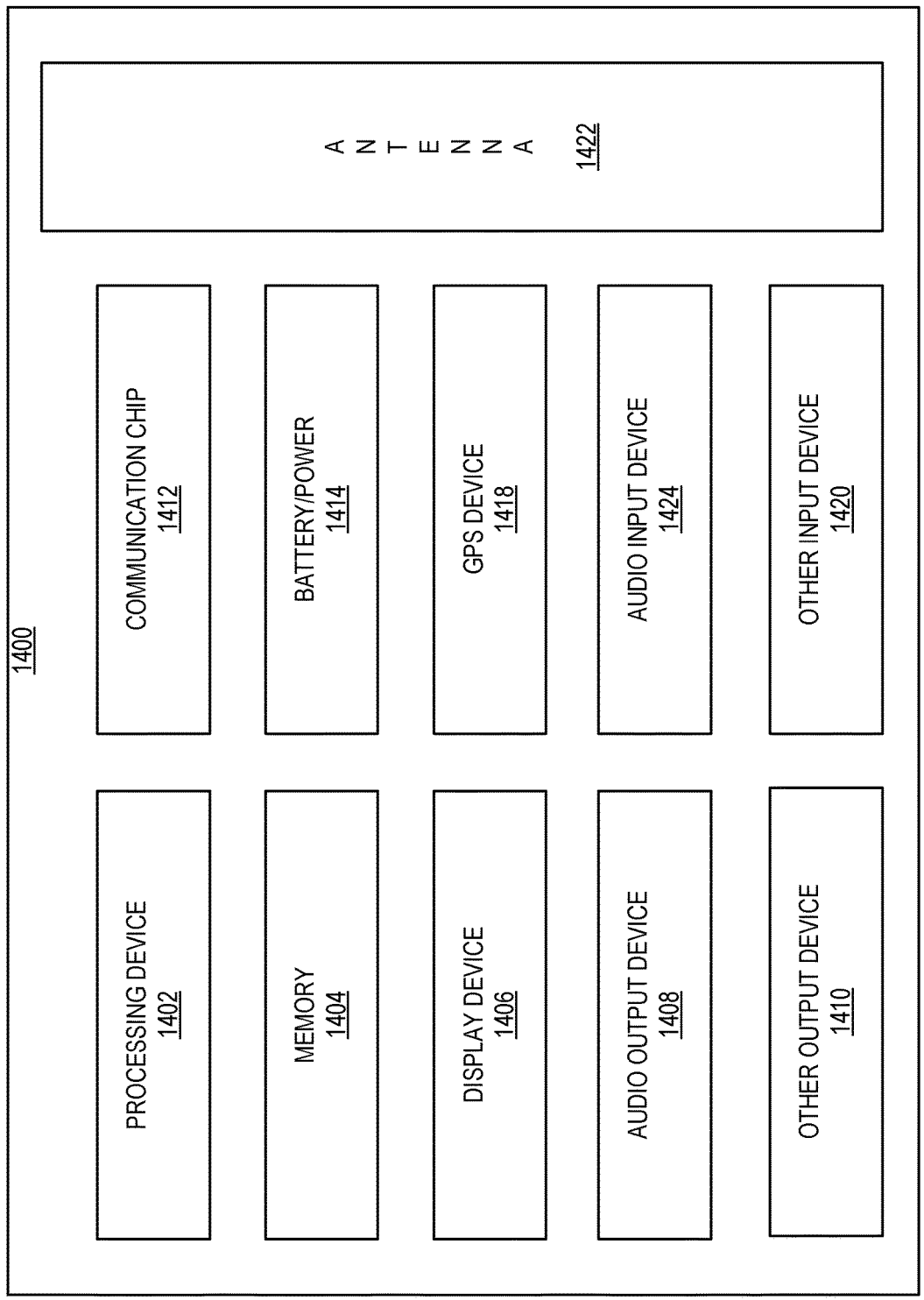
FIG. 14 is a block diagram of an example electrical device that may include one or more components such as processors or other components designed to implement a GUI that includes two or more of an object list, an image strip, and a LIDAR map, in accordance with various embodiments.

FIG. 14 is a block diagram of an example electrical device 1400 that may include one or more components such as processors or other components designed to implement a GUI that includes two or more of an object list, an image strip, and a LIDAR map, in accordance with various embodiments. A number of components are illustrated in FIG. 14 as included in the electrical device 1400, but any one or more of these components may be omitted or duplicated, as suitable for the application. In some embodiments, some or all of the components included in the electrical device 1400 may be attached to one or more motherboards. In some embodiments, some or all of these components are fabricated onto a single system-on-a-chip (SoC) die.

Additionally, in various embodiments, the electrical device 1400 may not include one or more of the components illustrated in FIG. 14, but the electrical device 1400 may include interface circuitry for coupling to the one or more components. For example, the electrical device 1400 may not include a display device 1406, but may include display device interface circuitry (e.g., a connector and driver circuitry) to which a display device 1406 may be coupled. In another set of examples, the electrical device 1400 may not include an audio input device 1424 or an audio output device 1408, but may include audio input or output device interface circuitry (e.g., connectors and supporting circuitry) to which an audio input device 1424 or audio output device 1408 may be coupled.

The electrical device 1400 may include a processing device 1402 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1402 may include one or more digital signal processors (DSPs), ASICs, central processing units (CPUs), graphics processing units (GPUs), cryptoprocessors (specialized processors that execute cryptographic algorithms within hardware), server processors, or any other suitable processing devices. The electrical device 1400 may include a memory 1404, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1404 may include memory that shares a die with the processing device 1402. This memory may be used as cache memory and may include embedded dynamic random-access memory (eDRAM) or spin transfer torque magnetic random-access memory (STT-MRAM).

In some embodiments, the electrical device 1400 may include a communication chip 1412 (e.g., one or more communication chips). For example, the communication chip 1412 may be configured for managing wireless communications for the transfer of data to and from the electrical device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The electrical device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The electrical device 1400 may include battery/power circuitry 1414. The battery/power circuitry 1414 may include one or more energy storage devices (e.g., batteries or capacitors) and/or circuitry for coupling components of the electrical device 1400 to an energy source separate from the electrical device 1400 (e.g., AC line power).

The electrical device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display.

The electrical device 1400 may include an audio output device 1408 (or corresponding interface circuitry, as discussed above). The audio output device 1408 may include any device that generates an audible indicator, such as speakers, headsets, or earbuds.

The electrical device 1400 may include an audio input device 1424 (or corresponding interface circuitry, as discussed above). The audio input device 1424 may include any device that generates a signal representative of a sound, such as microphones, microphone arrays, or digital instruments (e.g., instruments having a musical instrument digital interface (MIDI) output).

The electrical device 1400 may include a GPS device 1418 (or corresponding interface circuitry, as discussed above). The GPS device 1418 may be in communication with a satellite-based system and may receive a location of the electrical device 1400, as known in the art.

The electrical device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The electrical device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1400 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1400 may be any other electronic device that processes data.

EXAMPLES OF VARIOUS EMBODIMENTS

Example 1 includes one or more non-transitory computer-readable media comprising instructions that, upon execution of the instructions by one or more processors of a computing device, are to cause the computing device to: generate, in a first portion of a GUI, a first displayed image related to one or more images of a location in which a vehicle is present; generate, in a second portion of the GUI, a second displayed image related to detection and ranging information of the location, wherein the second displayed image includes an indication of a field of view of the first displayed image; identify a user interaction in the first portion of the GUI; and alter, based on the user interaction, the second portion of the GUI.

Example 2 includes the one or more non-transitory computer-readable media of example 1, or some other example or embodiment herein, wherein the user interaction is a change of breadth of the field of view; and wherein the alteration of the second portion of the GUI is a change to the indication of the field of view.

Example 3 includes the one or more non-transitory computer-readable media of example 1, or some other example or embodiment herein, wherein the user interaction is rotation of the field of view; and wherein the alteration of the second portion of the GUI is a rotation of the indication of the field of view.

Example 4 includes the one or more non-transitory computer-readable media of example 1, or some other example or embodiment herein, wherein the user interaction relates to selection of an object in the first displayed image; and wherein the alteration of the second portion of the GUI is a highlighting of an object in the second displayed image.

Example 5 includes the one or more non-transitory computer-readable media of any of examples 1-4, or some other example or embodiment herein, wherein the instructions are further to generate, in a third portion of the GUI, an object list that includes representations of objects in the first and second displayed images.

Example 6 includes the one or more non-transitory computer-readable media of example 5, or some other example or embodiment herein, wherein the instructions are further to highlight an entry in the object list based on selection of an object in the first displayed image.

Example 7 includes the one or more non-transitory computer-readable media of any of examples 1-4, or some other example or embodiment herein, wherein the detection and ranging information is related to RADAR information.

Example 8 includes the one or more non-transitory computer-readable media of any of examples 1-4, or some other example or embodiment herein, wherein the detection and ranging information is related to LIDAR information.

Example 9 includes an electronic device comprising: one or more processors; and one or more non-transitory computer-readable media comprising instructions that, upon execution of the instructions by the one or more processors, are to cause the one or more processors to: generate, in a first portion of a GUI, a vision field related to one or more images of a location in which a vehicle is present; generate, in a second portion of the GUI, a map image related to LIDAR information of the location, wherein the map image includes an indication of the vision field; identify a user interaction in the second portion of the GUI; and alter, based on the user interaction, the first portion of the GUI.

Example 10 includes the electronic device of example 9, or some other example or embodiment herein, wherein the user interaction relates to selection of an object in the second portion of the GUI; and wherein the alteration is rotation of the vision field.

Example 11 includes the electronic device of example 10, or some other example or embodiment herein, wherein the instructions are further to rotate, based on the user interaction, the indication of the vision field in the map image.

Example 12 includes the electronic device of example 9, or some other example or embodiment herein, wherein the user interaction relates to selection of an object in the second portion of the GUI; and wherein the alteration relates to a change in breadth of the vision field.

Example 13 includes the electronic device of example 12, or some other example or embodiment herein, wherein the instructions are further to change, based on the user interaction, a breadth of the indication of the vision field in the map image.

Example 14 includes the electronic device of any of examples 9-13, or some other example or embodiment herein, wherein the instructions are further to: generate, in a third portion of the GUI, an object list that includes representations of objects depicted in the vision field and the map image.

Example 15 includes one or more non-transitory computer-readable media comprising instructions that, upon execution of the instructions by one or more processors of a computing device, are to cause the computing device to: generate, in a first portion of a GUI, a first displayed image related to one or more images of a location in which a sensing device is present, wherein the first displayed image includes representations of a first portion of objects at the location; generate, in a second portion of the GUI, a second displayed image related to LIDAR information of the location, wherein the second displayed image includes: an indication of a field of view of the first displayed image; representations of the first portion of objects; and representations of a second portion of objects at the location; generate, in a third portion of the GUI, an object list that includes representations of the first portion of objects and representations of the second portion of objects; identify a user interaction in the third portion of the GUI; and alter, based on the user interaction, the first and second portions of the GUI.

Example 16 includes the one or more non-transitory computer-readable media of example 15, or some other example or embodiment herein, wherein the user interaction relates to a selection, in the object list, of a representation of an object of the first portion of objects; and wherein the alteration is an enhancement to the representation of the object in the first and second portions of the GUI.

Example 17 includes the one or more non-transitory computer-readable media of example 15, or some other example or embodiment herein, wherein the user interaction relates to a selection, in the object list, of a representation of an object of the first portion of objects; and wherein the alteration is: a rotation of the first displayed image; and a rotation of the indication of the field of view of the first displayed image.

Example 18 includes the one or more non-transitory computer-readable media of example 15, or some other example or embodiment herein, wherein the user interaction relates to a selection, in the object list, of a representation of an object of the first portion of objects; and wherein the alteration is: a change of breadth of the first displayed image; and a change of breadth of the indication of the field of view of the first displayed image.

Example 19 includes the one or more non-transitory computer-readable media of example 15, or some other example or embodiment herein, wherein the user interaction relates to a selection, in the object list, of a representation of an object of the second portion of objects; and wherein the alteration is: display of an indication that the object is outside of a field of view of the first displayed image; and enhancement to the representation of the object in the second portion of the GUI.

Example 20 includes the one or more non-transitory computer-readable media of any of examples 15-19, or some other example or embodiment herein, wherein the first and second displayed images are based on data acquired by the sensing device.

Example 21 includes an apparatus comprising circuitry to perform one or more functions, techniques, processes, or methods related to any of examples 1-20, some combination thereof, or any other example or embodiment of the present disclosure.

Example 22 includes one or more non-transitory computer-readable media comprising instructions that, upon execution of the instructions by one or more processors of an electronic device, are to cause the electronic device to perform one or more functions, techniques, processes, or methods related to any of examples 1-20, some combination thereof, or any other example or embodiment of the present disclosure.

Example 23 includes a method that includes or is related to one or more functions, techniques, processes, or methods related to any of examples 1-20, some combination thereof, or any other example or embodiment of the present disclosure.

Example 24 includes an apparatus comprising means to perform or facilitate the performance of one or more functions, techniques, processes, or methods related to any of examples 1-20, some combination thereof, or any other example or embodiment of the present disclosure.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A method for providing intuitive user interactions that reduce object identification time and improve object identification accuracy, comprising:
    generating a first portion of a graphical user interface (GUI) comprising visible-light camera images of a location around a vehicle, wherein the visible-light camera images are laid side by side to form an image strip, and a subset of the visible-light camera images are visible to a user through the first portion of the GUI based on a vision field of the image strip;
    generating a second portion the GUI comprising a map displaying data from a light detection and ranging (LIDAR) system and a directional halo representing the vision field of the image strip;
    receiving a user interaction in the first portion of the GUI, wherein the user interaction includes a selection of an object in the first portion of the GUI and an alteration of the vision field of the first portion of the GUI;
    altering the directional halo of the second portion of the GUI to include the object within directional halo in the second portion of the GUI and to represent the altered vision field; and
    causing the object in the second portion of the GUI to be accentuated.

2. The method of claim 1, further comprising:
    receiving a confirmation from the user that the object is properly identified, classified, or labeled.

3. The method of claim 2, further comprising:
    storing objects confirmed by the user using the GUI in a database as annotated data usable to train machine learning models.

4. The method of claim 1, further comprising:
    generating a third portion of the GUI comprising a list of object labels.

5. The method of claim 4, wherein each object label comprises one or more of: a unique identifier, an object class, and metadata about a corresponding object.

6. The method of claim 4, further comprising:
    causing an object label corresponding to the object in the third portion of the GUI to be accentuated.

7. The method of claim 1, wherein:
    the alteration of the vision field comprises a rotation of the vision field to center the object in the vision field; and
    altering the directional halo comprises rotating the directional halo in the second portion of the GUI to represent the altered vision field.

8. The method of claim 1, wherein:
    the alteration of the vision field comprises a zoom action of the vision field to center the object in the vision field; and
    altering the directional halo comprises changing a breadth of the directional halo in the second portion of the GUI to represent the altered vision field.

9. The method of claim 1, wherein the map further displays data from a radio detection and ranging system.

10. One or more non-transitory computer-readable media comprising instructions for providing intuitive user interactions that reduce object identification time and improve object identification accuracy, that, upon execution of the instructions by one or more processors of a computing device, are to cause the computing device to:
    generate a first portion of a graphical user interface (GUI) comprising visible-light camera images of a location around a vehicle, wherein the visible-light camera images are laid side by side to form an image strip, and a subset of the visible-light camera images are visible to a user through the first portion of the GUI based on a vision field of the image strip;
    generate a second portion the GUI comprising a map displaying data from a light detection and ranging (LIDAR) system and a directional halo representing the vision field of the image strip;
    receive a user interaction in the first portion of the GUI, wherein the user interaction includes a selection of an object in the first portion of the GUI and an alteration of the vision field of the first portion of the GUI;
    alter the directional halo of the second portion of the GUI to include the object within directional halo in the second portion of the GUI and to represent the altered vision field; and
    cause the object in the second portion of the GUI to be accentuated.

11. The one or more non-transitory computer-readable media of claim 10, wherein the instructions are to cause the computing device to further:
    receive a confirmation from the user that the object is properly identified, classified, or labeled; and
    store objects confirmed by the user using the GUI in a database as annotated data usable to train machine learning models.

12. The one or more non-transitory computer-readable media of claim 10, wherein the instructions are to cause the computing device to further:
    generate a third portion of the GUI comprising a list of object labels; and
    cause an object label corresponding to the object in the third portion of the GUI to be accentuated.

13. The one or more non-transitory computer-readable media of claim 10, wherein:
    the alteration of the vision field comprises a rotation of the vision field to center the object in the vision field; and
    altering the directional halo comprises rotating the directional halo in the second portion of the GUI to represent the altered vision field.

14. The one or more non-transitory computer-readable media of claim 10, wherein:
    the alteration of the vision field comprises a zoom action of the vision field to center the object in the vision field; and altering the directional halo comprises changing a breadth of the directional halo in the second portion of the GUI to represent the altered vision field.

15. The one or more non-transitory computer-readable media of claim 10, wherein the map further displays data from a radio detection and ranging system.

16. An object identification system for providing intuitive user interactions that reduce object identification time and improve object identification accuracy, comprising:
   one or more processors;
   one or more memory devices storing instructions to be executed by the one or more processors; and
   one or more display devices in communication with the one or more processors to display a graphical user interface (GUI);
   wherein the instructions are to cause the one or more processors to:
      generate a first portion of a graphical user interface (GUI) comprising visible-light camera images of a location around a vehicle, wherein the visible-light camera images are laid side by side to form an image strip, and a subset of the visible-light camera images are visible to a user through the first portion of the GUI based on a vision field of the image strip;
      generate a second portion the GUI comprising a map displaying data from a light detection and ranging (LIDAR) system and a directional halo representing the vision field of the image strip;
      receive a user interaction in the first portion of the GUI, wherein the user interaction includes a selection of an object in the first portion of the GUI and an alteration of the vision field of the first portion of the GUI;
      alter the directional halo of the second portion of the GUI to include the object within directional halo in the second portion of the GUI and to represent the altered vision field; and
      cause the object in the second portion of the GUI to be accentuated.

17. The object identification system of claim 16, wherein the instructions are to cause the one or more processors to further:
   receive a confirmation from the user that the object is properly identified, classified, or labeled; and
   store objects confirmed by the user using the GUI in a database as annotated data usable to train machine learning models.

18. The object identification system of claim 16, wherein the instructions are to cause the one or more processors to further:
   generate a third portion of the GUI comprising a list of object labels; and
   cause an object label corresponding to the object in the third portion of the GUI to be accentuated.

19. The object identification system of claim 16, wherein:
   the alteration of the vision field comprises a rotation of the vision field to center the object in the vision field; and
   altering the directional halo comprises rotating the directional halo in the second portion of the GUI to represent the altered vision field.

20. The object identification system of claim 16, wherein:
   the alteration of the vision field comprises a zoom action of the vision field to center the object in the vision field; and
   altering the directional halo comprises changing a breadth of the directional halo in the second portion of the GUI to represent the altered vision field.

* * * * *